(12) United States Patent
Neise et al.

(10) Patent No.: US 7,316,216 B2
(45) Date of Patent: Jan. 8, 2008

(54) VALVE ADJUSTING DEVICE

(75) Inventors: Ralf Neise, Berlin (DE); Marc Anton Münich, Gross Glienicke (DE)

(73) Assignee: Pierburg GmbH, Neuss (DE)

( * ) Notice: Subject to any disclaimer, the term of this patent is extended or adjusted under 35 U.S.C. 154(b) by 0 days.

(21) Appl. No.: 10/595,148

(22) PCT Filed: Aug. 24, 2004

(86) PCT No.: PCT/EP2004/009425

§ 371 (c)(1),
(2), (4) Date: Sep. 22, 2006

(87) PCT Pub. No.: WO2005/028936

PCT Pub. Date: Mar. 31, 2005

(65) Prior Publication Data

US 2007/0006844 A1    Jan. 11, 2007

(30) Foreign Application Priority Data

Sep. 5, 2003    (DE) .................................. 103 41 396

(51) Int. Cl.
*F02D 9/08* (2006.01)
(52) U.S. Cl. .................................................... 123/337
(58) Field of Classification Search ................ 123/399, 123/337; 251/305
See application file for complete search history.

(56) References Cited

U.S. PATENT DOCUMENTS

| | | | |
|---|---|---|---|
| 4,969,437 A | 11/1990 | Kolb | |
| 5,141,070 A | 8/1992 | Hickmann et al. | |
| 6,279,535 B1* | 8/2001 | Matsusaka | 123/399 |
| 6,505,643 B2* | 1/2003 | Scholten et al. | 137/554 |
| 6,581,569 B2 | 6/2003 | Arsic et al. | |
| 6,763,582 B2* | 7/2004 | Kaiser et al. | 29/854 |

(Continued)

FOREIGN PATENT DOCUMENTS

DE    41 42 810 C2    4/1998

(Continued)

OTHER PUBLICATIONS

International Search Report issued in corresponding application No. PCT.EP2004/009425 completed Dec. 1, 2004 and mailed Dec. 10, 2004.

(Continued)

*Primary Examiner*—Hai Huynh
(74) *Attorney, Agent, or Firm*—Griffin & Szipl, P.C.

(57) ABSTRACT

The invention relates to a throttle valve adjusting device (1) which comprises a throttle valve housing (2) linked with a drive unit (6). According to the invention, the electric motor (7) of said drive unit (6) is disposed both outside the housing (9) of the drive unit (6) and outside the throttle valve housing (2) so that its pole tube (16) lies substantially exposed and at the same time serves as the motor casing. Said pole tube (16) has a closed (18) and an open end (17) which is closed by a contact plate (10), while the closed end (18) comprises a bearing element (19) for the drive shaft (14) of the electric motor (7). The inventive throttle valve housing is improved in terms of construction space required and materials used, thereby considerably reducing the costs for production and assembly as well as reducing its weight.

16 Claims, 2 Drawing Sheets

U.S. PATENT DOCUMENTS

| | | | |
|---|---|---|---|
| 6,772,730 B2 * | 8/2004 | Kohlen | 123/337 |
| 6,789,526 B2 * | 9/2004 | Torii et al. | 123/399 |
| 6,863,259 B2 * | 3/2005 | Torii et al. | 251/305 |
| 6,886,806 B2 * | 5/2005 | Borasch et al. | 251/305 |
| 6,962,325 B2 * | 11/2005 | Torii et al. | 251/305 |
| 7,159,563 B1 * | 1/2007 | Garrick | 123/399 |
| 2006/0157027 A1 * | 7/2006 | Ichikawa et al. | 123/399 |

FOREIGN PATENT DOCUMENTS

| | | |
|---|---|---|
| DE | 19825727 A1 | 12/1999 |
| DE | 10048937 A1 | 4/2002 |
| DE | 100 60 291 A1 | 6/2002 |

OTHER PUBLICATIONS

Office Action issued in corresponding German patent application No. DE 103 41 396.0 dated Mar. 10, 2004.

* cited by examiner

VALVE ADJUSTING DEVICE

This is a National Phase Application in the U.S. of International Patent Application No. PCT/EP2004/009425 filed Aug. 24, 2004, which claims priority on German Patent Application No. DE 103 41 396.0, filed Sep. 5, 2003. The entire disclosures of the above patent applications are hereby incorporated by reference.

FIELD OF THE INVENTION

The invention relates to a valve adjusting device, in particular a throttle valve adjusting device for combustion engines, with a valve housing that features a valve connected to a valve shaft, by which the valve is pivoted in the valve housing at least on one side, and with a drive unit that features at least one electric motor and a reduction gear to drive the valve, and a sensor for reporting the position of the valve adjustment, whereby at least the gear is arranged in a housing that features a contact plate fixed to the valve housing and a cover closing the housing.

BACKGROUND OF THE INVENTION

Various generic valve adjusting devices are known and are described in a large number of patent applications. It is customary thereby either to embody the throttle valve housing in one piece with the housing for the gear and the electric motor, in order then to close the gear by means of a gear cover, or to flange-mount the entire drive unit to the throttle valve housing, whereby the housing surrounds the entire drive unit.

One valve adjusting device is described, for example, in DE 100 48 937 A1. While the throttle valve is completely supported in the throttle valve housing via its throttle valve shaft, the entire drive unit with electric motor and gear is arranged in a housing that is subsequently fixed to the throttle valve housing. An electrical connecting plug is also integrated on the housing of the drive unit.

Through DE 198 25 727 A1, a throttle valve housing is disclosed in which a housing of the throttle valve housing holds both the throttle valve and the drive unit, whereby the housing features a working space in which an element carrier is arranged via which the transmission elements are supported. This element carrier is fixed to the housing of the throttle valve housing. The housing of the electric motor is thereby permanently connected to the element carrier, as are a sleeve carrying the bearing of the throttle valves, and a gear center wheel axle. The bearing points of both the output shaft of the motor and, as already mentioned, of the throttle valve are thus arranged in the element carrier.

While finishing work on the throttle valve housing is omitted, the assembly of such a device is distinctly more complicated. In particular, the linkings of the motor, the gear center wheel axle, and the bearing for the throttle valve shaft to the element carrier require a high assembly expense. Moreover, the throttle valve housing and the drive unit are not independent so that the drive unit cannot also be used as a module for other throttle valve housings.

In the embodiment of the earlier described document DE 100 48 937 A1, the disadvantage exists in that the installation space needed for installation continues to be relatively large and the motor must be inserted into the housing completely pre-mounted in order to be additionally fixed or supported there.

The object of the invention is, therefore, to make available a valve adjusting device that is of modular construction, reduces costs during the production and assembly, in particular by means of a reduction in components, and can be adapted to given space circumstances. Any individual parts of the valve adjusting device that are to be exchanged, or that are modifiable, must be accessible in a simple manner. Moreover, a goal of the present invention is a reduction in weight.

SUMMARY OF THE INVENTION

These objects are achieved in that the electric motor is arranged outside the housing and the valve housing, whereby the electric motor is embodied open on one side and pole tube whose first open end, placed on and over a drive shaft of the electric motor and directed towards a drive gear end of the drive shaft of the electric motor, is plugged on an annular shoulder of the contact plate running axially, by means of which its open end can be closed, and whose second, closed end is arranged at least indirectly in a bearing block of the valve housing, whereby the drive shaft of the electric motor is supported on the one side in the contact plate and on the other side in a bearing position at the closed end of the pole tube, and whereby the pole tube simultaneously serves as the housing of the electric motor.

Through such an embodiment, the material used is minimized because housing parts are omitted. The remaining parts can be produced with forms free of sliding elements, so it is largely possible to dispense with insert parts during production. Accordingly, both costs and the weight and the dimensions of the valve adjusting device are reduced. There is also good accessibility and, thus, good exchangeability of the individual parts.

In an advantageous embodiment, the essentially axially running annular shoulder of the contact plate is embodied in the form of segments so that the pole tube is pre-fixed to the contact plate and, thus, a fixed positioning between the electric motor and the contact plate takes place with less material required.

In a preferred form of embodiment, magnets are fixed in the pole tube by means of an axially arranged spring element that presses the magnets in a tangential direction against at least one projection on the inner wall of the pole tube, and the pole tube features, at least on the side facing the valve housing, a flat spot running in the axial direction. This flat spot corresponds to the inner projection, whereby the result of such an embodiment is that a larger free area of the installation space is achieved.

In another preferred form of embodiment, brush springs of the electric motor connected to a collector are fixed on the contact plate of the adjusting device by either frictional or positive engagement connections for contacting, as a result of which the assembly of the motor and the mounting of the motor on the contact plate are simplified and additional assembly steps can be saved, whereby at the same time a secure type of contacting between a permanent direct current motor and a power supply is provided.

In a further embodiment, the contact plate features an attachment flange to fix a plug to the electrical contacting, whereby connecting pins of the respective plug are injected or locked in. Through this form of embodiment, the electrical connection in the form of the plug to be used, respectively, can be adapted to customer-specific requirements in a simple manner, whereby at the same time a tight closure is ensured.

A simplification of the assembly, by fixing the relative position of the gear housing and the throttle valve housing with respect to one another, is achieved in that the gear features a drive gear arranged on the drive shaft of the electric motor so that it is at least torsionally rigid, a gear center wheel in the form of a double gear wheel that is supported on a gear center wheel axle and features a drive gear arranged on the valve shaft so that it is at least torsionally rigid, whereby the gear center wheel axle is fixed to the valve housing and extends into the housing of the gear through a hole in the base plate.

In another preferred form of embodiment, the valve housing is made of light metal such as, for example, aluminum die casting or magnesium die casting or plastic. In this manner, a high stability and also high heat resistance are optimally combined with a low weight.

To further reduce the total mass of the valve adjusting device, the contact plate is made of a nonconductive plastic.

In another preferred form of embodiment, the sensor is embodied as a potentiometer, which is arranged in the housing and whose conducting tracks are printed directly onto the contact plate or a printed circuit board, by which simple programming requiring a small amount of memory is provided in the control of position reporting through the linearity of the potentiometer that is present.

In a further form of embodiment, the electrical conducting tracks are arranged in the housing and printed or sprayed or injected onto the contact plate. Consequently, additional printed circuit boards are avoided, the assembly is simplified, and, at the same time, a reliable electrical connection is created.

In an alternative form of embodiment, the electrical conducting tracks are embodied as stampings that are arranged bare in the housing of the gear, which achieves a high flexibility with regard to the respective connections. This embodiment, as stampings, has the advantage that a high stability of the individual conducting tracks is achieved, whereby at the same time a good exchangeability is provided in case of possible defects. Advantageously, accommodation to corresponding customer-specific plugs can be done at very low cost.

The electric motor is preferably fixed, via screws or projections embodied at the closed end of the pole tube, to the bearing block so that it is torsionally rigid and these projections engage in corresponding recesses of the bearing block, which determines in a simple manner the position of the pole tube, and thus of the electric motor, with respect to the contact plate and thus with respect to the brushes and to the throttle valve housing.

In an alternative form of embodiment, the torsional strength of the pole tube is produced via the axially running shoulder of the contact plate in that the flat spot of the pole tube engages in a corresponding flat spot of the otherwise annular shoulder. In this manner, the position of the pole tube with respect to the contact plate, the brushes, and the throttle valve housing is also determined without additional assembly steps.

In another alternative embodiment, the torsional strength of the pole tube is produced by means of a screw connection between the pole tube and the contact plate. Thus, the shaping of the pole tube or the contact plate is simplified, and the tolerances to be maintained can be selected to be larger.

Thus, in accordance with the present invention, a valve adjusting device is made available in which the material use is minimized and both production and assembly of the valve adjusting device are distinctly simplified. Accordingly, not only production costs, but also the weight and the dimensions of the adjusting device, can be reduced whereby, at the same time, a high capacity for variation is created through the modular construction so that identical drive units can be used for different valve housings.

BRIEF DESCRIPTION OF THE DRAWINGS

An exemplary embodiment of a valve adjusting device according to the invention is shown in the drawings and described below.

DETAILED DESCRIPTION OF THE INVENTION

Figure 1:
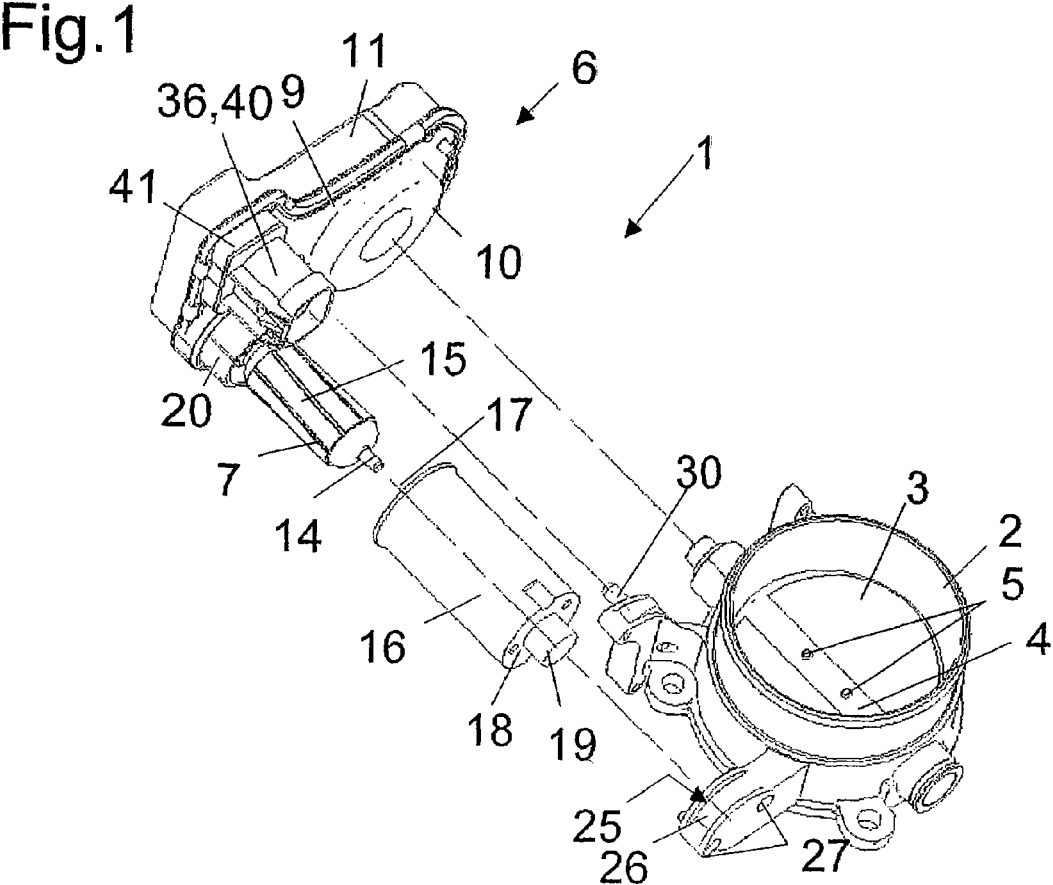
FIG. 1 shows, in perspective view, a partly exploded representation of an adjusting device according to the invention for attachment to a throttle valve housing.

The exemplary embodiment shown in the Figures of a valve adjusting device 1, according to the invention, comprises a valve housing 2, in which a valve 3 is fixed on a shaft 4 via screws 5. The valve shaft 4 can thereby be caused to rotate via a drive unit 6, so that the valve body 3 opens a duct cross-section of varying size in the housing 2.

Figure 2:
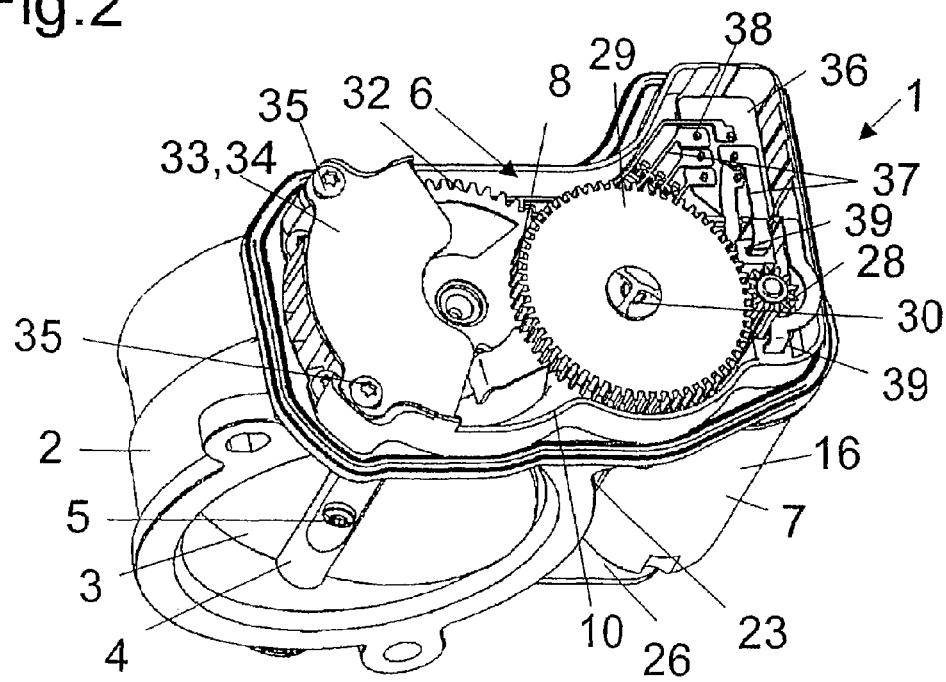
FIG. 2 shows the valve adjusting device, according to the invention, in perspective view without a cover.

As shown in FIGS. 1 and 2, the drive unit 6 comprises an electric motor 7 that is in operative connection with the valve shaft 4 via a reduction gear 8. The reduction gear 8 is arranged in a housing 9 that essentially comprises a contact plate 10 and a cover 11 that essentially seals the contact plate tightly.

Figure 3:
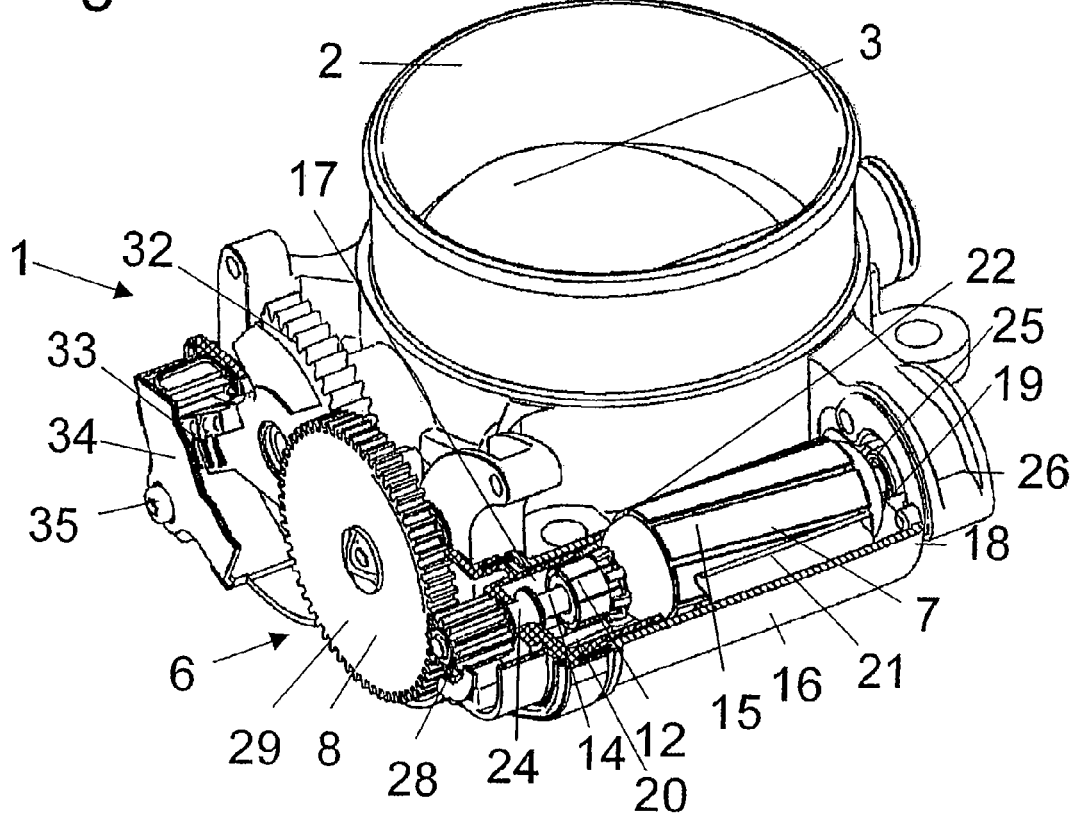
FIG. 3 shows the adjusting device, according to the invention, in perspective view, wherein a housing and a pole tube are shown partially cut open.

The electric motor 7 is embodied in the exemplary embodiment as a permanent magnet direct current motor and accordingly features a collector 12 that is in operative connection with brush springs 13, via which the electrical contacting takes place in a known manner. The construction of the electric motor 7 can be seen in particular from FIGS. 3 and 4. The collector 12 and a rotor 15 are arranged on a drive shaft 14 of the electric motor. The rotor 15 with the drive shaft 14 and the collector 12 is arranged in a pole tube 16 that features an open end 17 and a closed end 18 in which the drive shaft 14 is supported in a bearing point 19. To close the open end 17 of the pole tube 16 and to fix the pole tube 16 on the contact plate 10, the latter features a shoulder 20 onto which the pole tube 16 is pushed during the assembly. This shoulder 20 can be embodied either as a closed ring or only as ring segments. On the inner walls of the pole tube 16 two correspondingly shaped permanent magnets, not shown in the drawings, are situated, which magnets are pressed against a projection 22 running axially, in tangential direction by means of a spring element 21. Corresponding to this projection 22 embodied on the inner side of the pole tube 16, a flat spot 23 is situated on this side so that the entire motor can be installed very close to the valve housing 2 as shown in FIG. 2. The fixing of the magnets, not shown, takes place without additional adhesive due to the arrangement with the axially running spring element 21 that exerts the tangential forces, and due to the projection 22. The pole tube 16 simultaneously fulfills the function of a motor housing, whereby a decidedly good heat removal is provided. The drive shaft 14 is supported at the open end 17 of the pole tube 16 via a bearing element 24 arranged in a corresponding hole of the contact plate 10. The closed end 18 of the pole tube 16 is arranged in a recess 25 of a bearing block 26 (See FIG. 1). In the exemplary embodiment shown, the pole tube 16 is fixed to this bearing block 26 so that it is torsionally rigid, via screws, not shown, that are placed through holes 27 in the bearing block 26 and are screwed to the pole tube end 18.

The reduction gear 8 comprises a drive gear 28 arranged on the drive shaft 14 of the electric motor 7 so that it is at least torsionally rigid, and a gear center wheel 29 meshing with this drive gear 28, which gear center wheel is embodied as a double gear wheel. This double gear wheel is arranged on a gear center wheel axle 30, which is arranged permanently on the throttle valve housing as is clear from FIG. 1, and is introduced into the housing 9 through a hole 31. The smaller wheel of the double gear wheel 29 meshes with a driven gear 32 embodied as a gear wheel segment, and is arranged on the valve shaft 4 so that it is at least torsionally rigid. This driven gear 32 is connected in a known manner to arms 33 of a potentiometer that correspond to corresponding arm tracks, not shown. These arm tracks are printed onto a circuit board 34 of the potentiometer, which board is connected via screws 35 to the contact plate 10.

The contacting between the arm tracks of the circuit board 34 and a plug 36 as well as between the brush springs 13 of the electric motor 7 and the plug 36 takes place via stamped conducting tracks 37, which are embodied as main fanning strips placed in the housing and fixed there. While in the exemplary embodiment shown, the contacting takes place between pins 38 of the plug 36 and the conducting tracks 37 via a press connection, the connection between the conducting tracks 37 and the arm tracks or the brush springs 13 is frictional, in that the respective ends of the conducting tracks 37 lie in a springy manner against the corresponding contact surfaces of the circuit board 34 or brush springs 13.

Figure 4:
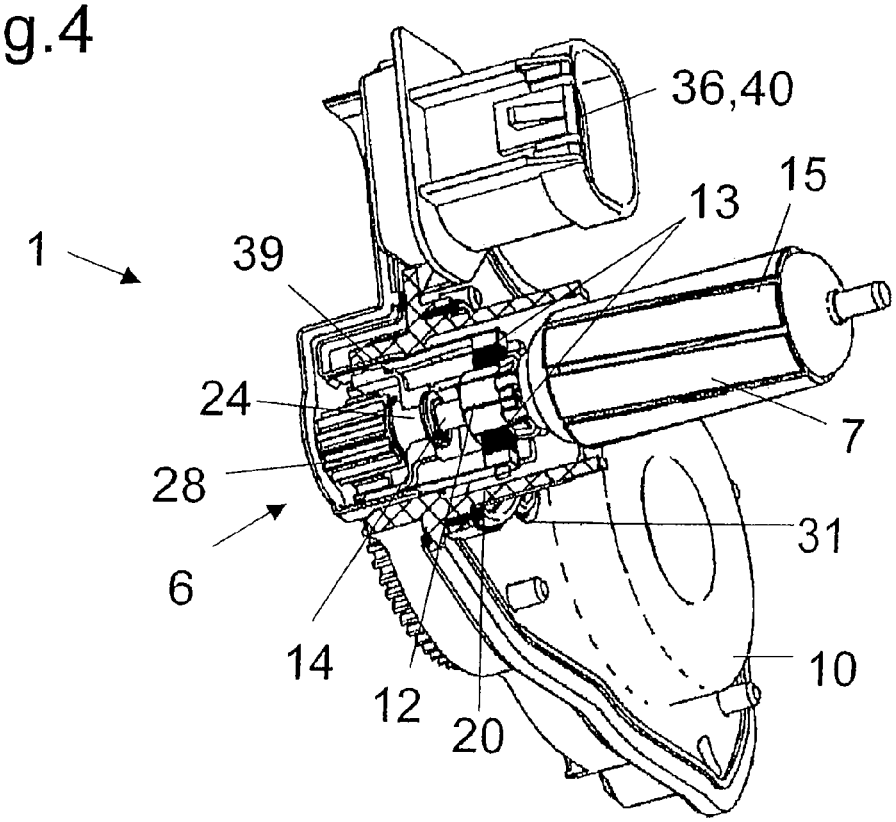
FIG. 4 shows the adjusting device, according to the invention, without throttle valve housing and pole tube in perspective view.

The position of the brush springs 13 in the contact plate 10 can be seen clearly in FIG. 4. Receiving pockets 39 running axially are provided on the contact plate 10, through which the brush springs 13 are pushed from the one side and the corresponding ends of the conducting tracks 37 from the other side. For this purpose, the brush springs 13 can feature a small hole, for example, at their end arranged in the contact plate 10, which hole locks in a corresponding small projection in each receiving pocket 39 so that the ends of the conducting tracks 37 press the brush springs 13 with their hole into this projection with frictional connection due to their spring action. Then, the rotor 15 is pushed onto the contact plate 10 whereby the two brushes 13 are pressed slightly apart, which produces the frictional connection to the rotating collector 12.

As a rule, the plug 36 is embodied such that the inner end with the pins 38 projects outwards and is surrounded by an outer plug part 40 that is plugged onto a corresponding attachment flange 41 embodied on the contact plate 10 and can be connected to the attachment flange 41 in various ways, for example, by means of a clip connection.

The described throttle valve adjusting device excels in its high flexibility as far as its connection to different throttle valve housings is concerned, whereby the installation space is minimized and a very good cooling is ensured due to the good heat transfer of the motor. All the components and embodiments used are in particular minimized with respect to their assembly- and production costs. In addition, a distinct reduction in weight is achieved through the embodiment of the valve housing employing light metal or plastic as well as through the production of the contact plate from a nonconductive plastic, or else through not additionally employing another housing of the electric motor and the gear shield.

Forms of embodiment deviating from this exemplary embodiment, in particular with respect to the contacting between a plug and a sensor which need not necessarily be embodied as a potentiometer, or else with respect to structural measures determining the torsional strength of the pole tube, are contained in the appended Claims.

The invention claimed is:

1. A throttle valve adjusting device for combustion engines, comprising:
   a valve housing;
   a valve connected to a valve shaft, via which the valve is pivoted in the valve housing at least on one side; and
   a drive unit comprising
   i. at least one electric motor and a reduction gear operably connected to drive the valve; and
   ii. a sensor for reporting a position of valve adjustment of the valve, wherein at least the reduction gear is arranged in a first housing that comprises a contact plate fixed to the valve housing and a cover closing the first housing, wherein the electric motor is arranged outside the first housing and outside the valve housing, wherein the electric motor is open on one side and is arranged in a pole tube, and the pole tube has a first open end directed towards a drive gear end of a drive shaft of the electric motor, and the first open end is plugged on an annular shoulder of the contact plate running axially so as to close the first open end, and the pole tube has a second closed end arranged at least indirectly in a bearing block of the valve housing, wherein the drive shaft of the electric motor is supported on one side in the contact plate and on an other side in a bearing position at the second closed end of the pole tube, and wherein the pole tube simultaneously serves as a housing of the electric motor.

2. A throttle valve adjusting device according to claim 1, wherein the axially running annular shoulder of the contact plate is in the form of segments and runs essentially axially.

3. A throttle valve adjusting device according to claim 2, wherein magnets are fixed in the pole tube by an axially arranged spring element that presses the magnets in a tangential direction against at least one projection on an inner wall of the pole tube, and the pole tube comprises, at least on a side facing the valve housing, a flat spot running in the axial direction.

4. A throttle valve adjusting device according to claim 1, wherein magnets are fixed in the pole tube by an axially arranged spring element that presses the magnets in a tangential direction against at least one projection on an inner wall of the pole tube, and the pole tube comprises, at least on a side facing the valve housing, a flat spot running in the axial direction.

5. A throttle valve adjusting device according to claim 4, wherein torsional strength of the pole tube is produced by the axially running shoulder of the contact plate since the flat spot of the pole tube engages in a corresponding flat spot of the otherwise annular shoulder.

6. A throttle valve adjusting device according to claim 1, wherein brush springs of the electric motor, connected to a collector, are fixed on the contact plate of the throttle valve adjusting device by either frictional or positive engagement connections for contacting.

7. A throttle valve adjusting device according to claim 1, wherein the contact plate comprises an attachment flange to fix a plug to electrical contacting, wherein the connecting pins of the plug are injected or locked in.

8. A throttle valve adjusting device according to claim 1, wherein the reduction gear comprises
   i. a drive gear arranged on the drive shaft of the electric motor so that the drive gear is at least torsionally rigid;
   ii. a gear center wheel in the form of a double gear wheel that is supported on a gear center wheel axle; and
   a driven gear arranged on the valve shaft so that the driven gear is at least torsionally rigid, wherein the gear center wheel axle is fixed to the valve housing and extends into the first housing of the reduction gear through a hole in the contact plate.

9. A throttle valve adjusting device according to claim 1, wherein the valve housing is made of light metal or plastic.

10. A throttle valve adjusting device according to claim 1, wherein the contact plate is made of a nonconductive plastic.

11. A throttle valve adjusting device according to claim 1, wherein the sensor is a potentiometer arranged in the first housing and has arm tracks printed directly onto the contact plate or a printed circuit board.

12. A throttle valve adjusting device according to claim 1, wherein electrical conducting tracks are arranged in the first housing and printed or sprayed or injected onto the contact plate.

13. A throttle valve adjusting device according to claim 1, wherein electrical conducting tracks comprising stampings are arranged bare in the first housing of the reduction gear.

14. A throttle valve adjusting device according to claim 1, wherein the electric motor is fixed, via screws or projections disposed at the second closed end of the pole tube, to the bearing block so that the electric motor is torsionally rigid.

15. A throttle valve adjusting device according to claim 1, wherein torsional strength of the pole tube is produced by a screw connection between the pole tube and the contact plate.

16. A throttle valve adjusting device according to claim 1, wherein the electric motor is fixed, via projections disposed at the second closed end of the pole tube, to the bearing block so that the electric motor is torsionally rigid and the projections engage in a corresponding recess of the bearing block.

* * * * *